Patented Feb. 7, 1933

1,896,240

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC MOLECULAR ASSOCIATION OF ORGANIC COMPOUNDS

No Drawing.    Application filed March 23, 1928. Serial No. 264,275.

This invention relates to the catalytic molecular association of organic compounds such as polymerizations, condensations, catalytic water gas process, and the like. Important classes of reactions coming under the above head are aldolizations, crotonizations, esterifications, and the like. The catalytic production of hydrocyanic acid from carbon monoxide and ammonia, however, is not considered as an organic molecular association within the scope of the present invention and is expressly excluded therefrom. Similarly, organic oxidation reactions in which an organic compound is reacted with an oxidizer such as air to produce intermediate oxidation products or to burn out undesirable impurities do not fall within the scope of the present invention, as such oxidation reactions have a distinct status in the art.

According to the present invention organic molecular associations are carried out, particularly in the vapor phase, by means of a new class of contact masses. The contact masses used in the present invention contain base exchange bodies or their derivatives. Under the term "base exchange body" are included all natural or artificial bodies which possess the properties of exchanging their bases for other bases of salt solutions. The base exchanging products used in making catalytic compositions of the present invention or as initial material for derivatives to be so used may possess high base exchanging power or in many cases may possess lower base exchanging power, since the catalytic value of the final compositions is not primarily dependent on the amount of base exchanging power present. In general the base exchange bodies may be divided into two main categories:—Two-component and multi-component zeolites, i. e., base exchange bodies containing chemically combined silicon in their nucleus and non-silicious base exchange bodies in which all of the silicon is replaced by other suitable acidic or amphoteric metal oxides. Two-component zeolites are the reaction products of two types of initial components, that is to say, metallates and silicates, (using the term metallate in a somewhat broader sense as will be defined further on in the description), or metal salts and silicates. Frequently more than one member of a type may enter into reaction, that is to say, a silicate may react with more than one metallate or more than one metal salt. The multi-component zeolites are the reaction products of at least three types of components, that is to say, at least one silicate, at least one metallate, and at least one metal salt.

The base exchange bodies, both zeolites and non-silicious base exchange bodies, may be associated with diluents preferably in the form of a physically homogeneous structure, as will be described below. Either diluted or undiluted base exchange bodies may be present in the contact masses used in the present invention, or their derivatives may be present, but it should be understood that wherever base exchange bodies are referred to both diluted and undiluted products are included.

Base exchange bodies, both zeolites and non-silicious base exchange bodies, may also be transformed into derivatives which possess many of the chemical and most of the physical characteristics of the parent base exchange bodies. Such derivatives may be salt-like bodies, that is to say, the reaction products of base exchange bodies with compounds containing anions capable of reacting with the base exchange bodies to form products which possess many of the properties of salts. A further class of derivatives are the acid leached base exchange bodies. When a base exchange body is subjected to leaching by acids, particularly dilute mineral acids, the exchangeable bases are first gradually removed. The resulting products contain both the more basic and the more acidic components of the non-exchangeable nucleus of the base exchange body, with or without a portion of the exchangeable bases. As the leaching is carried on further, more and more of the relatively positive components of the non-exchangeable nucleus are removed, and if carried to completion the leached product contains only the relatively acid components of the non-exchangeable nucleus. In the case of zeolites the final product from long continued leaching is a complex silicic acid which has many of the physical properties of the original base exchange body. In the description and claims the class of base exchange bodies and their derivatives will be referred to by the generic term "permutogenetic" products.

Catalytically active components may be associated with diluted or undiluted permutogenetic bodies in four main forms, as follows:—(1) They may be physically admixed with or impregnated into the permutogenetic products. (2) They may be physically homogeneously incorporated into the permutogenetic products before the latter have been completely formed in the form of catalytically active diluent bodies or in the form of diluents which have been impregnated with catalytically active substances. (3) They may be chemically combined with or in the permutogenetic products in non-exchangeable form, that is to say, they may form a part of the non-exchangeable nucleus of the base exchange body present in the final contact mass or which is transformed into the derivatives, or they may be chemically combined with the base exchange bodies in the form of catalytically active anions which form with the base exchange body salt-like bodies. (4) They may be chemically combined in exchangeable form either during the formation of the base exchange body or by base exchange after formation. Obviously of course the same or different catalytically active components may be present in more than one of the above described forms, and it is an advantage of the present invention that catalytically active substances may be introduced in a wide variety of forms which gives a large field of choice to the catalytic chemist.

While the different permutogenetic products may vary widely in their chemical characteristics, they all possess a similar physical structure which is characterized by more or less high porosity, frequently microporosity, and great resistance to high temperatures, and in the case of products which have not been acid leached to the point of removal of catalytically active components these components are distributed throughout the framework of the products in atomic or molecular dispersion, as will be described in greater detail below, and this chemical homogeneity is one of the important advantages of some of the contact masses of the present invention.

While three of the methods of combination of the catalytically active substances may be effected with undiluted as well as diluted permutogenetic products, it has been found that for most reactions homogeneously diluted permutogenetic contact masses are of advantage, particularly where the diluents are of a physical nature such as to exert a desired influence on a catalytic activity of the contact masses, as when, for example, diluents are rich in silica, which has been found to have an activating power, or where the diluents by reason of high porosity, capillarity, or surface energy may be considered as physical catalysts or activators.

Base exchange bodies used in contact masses of the present invention behave as if they were products of extremely high molecular weight for catalytically active components can be introduced either into the non-exchangeable nucleus or in the form of exchangeable bases in practically any desirable proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is of course possible that the base exchange bodies, or some of them, may be solid solutions of a plurality of related compounds of lower molecular weight. It has not been possible hitherto to definitely settle this question, as base exchange bodies are not readily capable of structural chemical analysis. The present invention is of course not limited to any theory, but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the molecular association of organic compounds and in all cases the contact masses produced are highly effective by reason of the desirable physical structure of the permutogenetic products contained therein and the wide limits of homogeneous dilution of catalytically active molecules or atoms with resulting uniformity and smoothness of action, which is of great importance, particularly in the sensitive reactions for which contact masses used in the present invention are peculiarly adapted.

In addition to the important characteristics with which permutogenetic products endow the contact masses of the present invention it has been found that for many of the reactions coming within the scope of the present invention, it is desirable to stabilize the contact masses, and this may be effected by associating with the permutogenetic products or incorporating or forming therein compounds of the alkali forming metals, that is to say, the alkali metals, the alkaline earth metals, and the strongly basic earth metals. These compounds appear to slow up or smooth out the catalytic reaction, and will be referred to throughout this specification as stabilizers. The stabilizers may be non-alkaline, weakly alkaline or strongly alkaline, depending on the reaction products and on the nature of the catalytically active components used. It is a great advantage of the present invention that in the normal formation of base exchange bodies alkali forming metal oxides are present as exchangeable bases, and whether used without acid treatment or treated with acid, they form stabilizers which are combined in or associated with the resulting permutogenetic products in an extremely fine state of division in which the stabilizers are peculiarly active. Thus base exchange bodies containing alkali forming metal exchangeable bases may be considered as complex stabilizers.

In addition to the use of stabilizers which are important in a large number of molecular associations included in the scope of the present invention, it has been found that the stabilizer action and the overall efficiency of the contact masses can in many cases be greatly increased or enhanced by the association therewith or chemical combination therein of elements or radicals or groups which are catalytically active but do not possess specific catalytic activity for the particular reaction to be carried out. Many reactions involve the splitting off of water. In such reactions it is very desirable to incorporate catalysts or catalytic components which are not specific association catalysts but which may favor dehydration, or splitting off of carbon dioxide. Such catalysts or catalytic components which are not specific catalysts for the reaction in which they are being used under the reaction conditions obtaining will be referred to throughout the specification as stabilizer promoters, as they appear to enhance the toning effect which can be achieved by stabilizers. The use of this expression should, however, in no sense be taken to limit the invention to a particular theory of action of these non-specific catalysts and in fact in some cases stabilizer promoters may be present where there are no stabilizers.

The tremendous range of chemical groups which may be combined in or with or incorporated in permutogenetic products permits a wide choice of stabilizer promoters as well as specific catalysts and permits their association with the contact masses in an extremely homogeneous and catalytically efficient form. Thus many base exchange bodies or their derivatives may be considered as complex catalysts, stabilizers and stabilizer promoters, as all of these elements may be present in the same chemical compound and sharing the advantages flowing from its desirable physical structure and chemical properties. Of course both stabilizer and stabilizer promoters may be mixed partly or wholly with permutogenetic products and a single stabilizer or single stabilizer promoter may be present partly in physical admixture and partly in chemical combination, as will be clear to the skilled base exchange chemist.

The base exchange bodies which form the important components or initial material for derivatives in contact masses of the present invention may be prepared by any of the well known methods. Thus for example, two-component zeolites may be prepared by wet methods in which the metallate components or metal salt components, part or all of which may be catalytically active, are caused to react with soluble silicates to form zeolites of alumino silicate or aluminum double silicate types, or the components may be fused, preferably in the presence of fluxes. It should be understood that under the term metallate is included not only the alkaline solutions of amphoteric metal oxides or hydroxides but also alkali forming metal salts of metal acids, such as the oxyacids of metals of the fifth and sixth groups, which in at least one stage of oxidation are not strictly speaking amphoteric, but which products are capable of reacting with silicates to form zeolites, or with other components to form non-silicious base exchange bodies. Throughout the specification this somewhat more general definition of metallates will be strictly adhered to. In the formation of two-component zeolites by wet methods, the final reaction product must be alkaline to litmus, and for products of high base exchanging power it should be neutral or alkaline to phenolphthalein. For the purpose of producing base exchange bodies to be used in the preparation of contact masses of the present invention it is sometimes unnecessary to provide high base exchanging power, and for many purposes zeolites formed under conditions resulting in a final reaction which is acid to phenolphthalein but alkaline to litmus are of advantage. It is not definitely known whether products produced under such circumstances are homogeneous chemical compounds, although in many ways they behave as such. There is, however, reason to believe that in some cases at least mixtures of base exchanging and non-base exchanging polysilicates may be produced. For the purpose of the present specification a product will be considered as a base exchange product if it has any base exchange power at all.

It is desirable for many purposes, and particularly where two-component zeolites of high base exchanging power are needed, to add the relatively acid component, for example, metal salts in the case of aluminum double silicate type of silicates, to the relatively more alkaline components such as for example soluble silicates. By these means a continuous alkalinity is insured, and this method may be considered as the preferred method in most cases, but the opposite procedure is advantageous for certain contact masses and is included in the invention.

Multi-component zeolites may be prepared by any of the foregoing methods using at least three types of components, that is to say, at least one metallate, at least one metal salt and at least one soluble silicate. In the case of multi-component zeolites, as in the case of two-component zeolites, the conditions of alkalinity should be observed, and for many purposes it is advantageous to add the relatively acid components to the relatively alkaline components, in order to insure continuous alkaline reaction. The multi-component zeolites produced vary in their nature, dependent on the proportion of the different reacting components. Thus where the metallates and silicates predominate over the metal salts the resulting products resemble the alumino silicate type of two-component zeolites. If the metal salts and silicates predominate over the metallates the products resemble the aluminum double silicate type of two-component zeolites, and finally if the metallates and metal salts predominate over the silicates the resulting product resembles more or less non-silicious base exchange bodies. It will be clear that there is no sharp defining line between the three types of multi-component zeolites, and one shades into the other as the proportions of the different components vary. It is an advantage of the multi-component zeolites over the two-component zeolites that the choice of catalytically active components is wider, as some catalytically active elements or groups can only be incorporated in the form of metallates and others only in the form of metal salts. In a multi-component zeolite each catalytically active group can be incorporated in the form in which it is best available.

Non-silicious base exchange bodies are produced by the general methods described above, but instead of bringing about reactions between silicates and other metal oxide components, two or more oxymetal compounds are caused to react, in general, at least one will be a metallate and at least one a metal salt, or in some cases it is possible to bring about action between two different metallates in which one negative radical is more acidic than the other. It is possible to produce non-silicious base exchange bodies in which a single metal is present. Thus for example, some metals may be sufficiently amphoteric in character to form both metallates and metal salts which are capable of reacting with each other to produce base exchange bodies.

A special method of producing non-silicious base exchange bodies consists in the gradual neutralization of strongly alkaline salts of the oxyacids of metal elements of the fifth and sixth groups in stages of oxidation in which they are sufficiently amphoteric. The neutralization of other strongly alkaline metallates may also bring about formation of non-silicious base exchange bodies. The converse method, whereby non-alkaline salts of suitable metals are gradually treated with alkali until the reaction is sufficiently alkaline to permit the formation of base exchange bodies, may also be used.

Many metals are capable of entering into the base exchange formation only in certain stages of oxidation, and it is sometimes necessary to introduce such metals in a stage of oxidation different from that desired in the final base exchange body, the change of stage of oxidation being preferably effected during the formation of the base exchange body. Certain other elements may be incorporated in the form of complex compounds of the most various types, such as for example, ammonia complexes and the like.

In addition to the artificial base exchange bodies briefly described above, neutral base exchange bodies, such as nepheline, leucite, felspar, and the like, may be used.

The most important contact masses for many reactions contain permutogenetic products, in which preferably the diluents are homogeneously incorporated into the base exchange bodies before formation of the latter, or at least before the base exchange body has set after formation. Many diluents, both inert, stabilizing, activating, catalytically active, or having stabilizer promoter effects, can be used. A few of the diluents will be briefly enumerated:—kieselguhrs of all kinds, particularly natural or treated celite earth, silicious powders of various types, powdered permutogenetic products, natural or artificial powders of rocks, stones, tuffs, trass, lava, and similarly volcanic products which are frequently highly porous, greensand, glauconite or its acid leached derivative glaucosil, pulverized slag wool, cements, sand, silica gel, pulverized earthenware, fuller's earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper salts of the above, silicates, such as copper silicate, iron silicate, nickel silicate, cobalt silicate, aluminum silicate, titanium silicate, minerals or ores, especially those rich in copper, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted permutogenetic bodies may also be finely divided and used as part or all of the diluents of other base exchange bodies.

The following nine methods are the most effective for the introduction of diluents, but any other suitable methods can be used:

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies which are then incorporated into the base exchange bodies by any suitable methods of incorporation.

(3) Diluents may be mixed with base exchange bodies when the latter are still in the form of gels, by kneading or stirring, in which case the base exchange gel behaves as an adhesive. The homogeneity and uniformity of the distribution of the diluents is of course not quite so great by this method as by method (1), but for the catalytic molecular association of organic compounds extreme uniformity is not essential.

(4) Diluents may be formed during the formation of base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form insoluble diluents, as for example the heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is dried without washing or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The nucleus or non-exchangeable portion of the molecules of the base exchange bodies is ordinarily considered to consist of two types of oxides, namely, relatively basic metal oxides, usually amphoteric, and relatively acidic oxides, such as $SiO_2$, some amphoteric metal oxides and some metal oxides which have a distinctly acid character. The nucleus behaves as a single anion and cannot be split by ordinary chemical means, but it is advantageous to consider the two portions of the nucleus as the basic and acidic portions, bearing in mind of course that the nucleus behaves as a single group. The metal compounds which are capable of forming the basic portion of the nucleus are those of the following metals:—copper, silver, gold, bismuth, beryllium, zinc, cadmium, boron, aluminum, some rare earths, titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts, others are stabilizers, and still others are stabilizer promotors. Naturally the status of an element as catalyst or stabilizer promoter will vary with the particular reaction for which the final contact mass is to be used, and the choice of catalysts and stabilizer promoters together with the proportions will be determined by the particular molecular association of organic compounds for which the contact mass is to be used.

Examples of components forming the relatively acid portion of the base exchange nucleus are alkali metal silicates, which are soluble in alkali, and alkali metal salts of acids, such as those of boron, phosphorus, nitrogen, tin, titanium, vanadium, tungsten, chromium, niobium, tantalum, uranium, antimony, manganese, etc.

The exchangeable bases of the base exchange bodies may be substituted by base exchange, and the elements which can be introduced singly or in admixture by base exchange are the following:—copper, silver, gold, ammonium, beryllium, calcium, magnesium, caesium, potassium, sodium, zinc, strontium, cadmium, barium, lead, aluminum, scandium, titanium, zirconium, tin, antimony, thorium, vanadium, lithium, rubidium, thallium, bismuth, chromium, uranium, manganese, iron, cobalt, nickel, ruthenium, palladium, platinum and cerium.

Depending on the reactions in which the contact mass is to be used, the exchangeable bases introduced may be specific catalysts, they may be stabilizers, or they may be stabilizers promoters. They may be introduced as simple ions or as complex ions, and may enhance the catalytic activity of the final contact mass, improve its physical strength, or both.

As has been described above, base exchange bodies can be caused to react with compounds containing acidic radicals capable of forming therewith salt-like bodies. The radicals may be present in the form of simple acid radicals, polyacid radicals or complex acid radicals, and include radicals containing the following elements:—chromium, vanadium, tungsten, uranium, molybdenum, manganese, tantalum, niobium, antimony, selenium, tellurium, phosphorus, bismuth, tin, chlorine, platinum, boron. Among the complex radicals are ferro and ferricyanogen, certain ammonia complexes and the like. The amount of acid radicals caused to unite with the base exchange bodies to form salt-like bodies may be varied so that the resulting products may possess the character of acid, neutral or basic salts. Many of these acid radicals are stabilizers or stabilizer promoters for the catalytic molecular associations of organic compounds.

The base exchange bodies diluted or undiluted, or some of their salt-like body derivatives, may be treated with acids, such as mineral acids, for example, 2–10% sulfuric, hydrochloric or nitric acids, to remove part or all of the exchangeable bases, or also part or all of the basic portion of the nucleus.

In the case of zeolites, the partial leaching with acids, which leaves part or all of the basic portion of the nucleus or even part of the exchangeable bases, does not affect the function of the zeolites as catalysts when they contain catalytically active elements in the basic portion of the nucleus, or in some cases even exchangeable bases, and such partially leached catalysts are of great importance in many reactions. Where the leaching is carried out to completion the advantageous physical structure remains to a considerable extent the same but the remainder is of course a form of silica, or in the case of zeolites in which part of the silica is replaced by other acidic compounds, a mixture of the two, and usually will not be a specific catalyst for the reactions of the present invention. It serves, however, as an advantageous physical carrier of specific catalysts, and in the case of partially substituted zeolites may also contain stabilizer promoters.

Leached non-silicious base exchange bodies, either partially or completely leached, may contain catalytically active components and behave as catalysts, stabilizer promoters or both, and many important catalysts are thus obtained. This is particularly the case for reactions where a relatively alkali-free contact mass is required for best results and where the alkali content of a contact mass containing a base exchange body may be too great for optimum results.

Base exchange bodies or their derivatives, diluted or undiluted, may also be coated in the form of films on massive carrier granules or may be impregnated therein. The massive carriers may be inert, activating, or themselves catalysts. For example, certain catalytic metal alloys, and minerals, fall within this class. Aluminum or copper alloy granules perform an additional advantageous function in that their relatively high heat conductivity tends to prevent local overheating in exothermic reactions, which is of considerable importance in obtaining good yields, as many of the reactions, particularly esterifications, are equilibrium reactions, and at higher temperatures the equilibrium may be adversely affected with resulting lowering of yields and contamination of the product.

*Example 1*

A contact mass for the transformation of carbon monoxide and steam into carbon dioxide and hydrogen is prepared as follows:

(1) 5 parts of aluminum oxide, in the form of the freshly precipitated hydroxide, are dissolved in a minimum of 5 N. sodium hydroxide solution in order to form a sodium aluminate.

(2) 14 parts of zinc nitrate with 6 mols of water are dissolved in 100 parts of water and 10 N. sodium hydroxide is added until sodium zincate is formed.

(3) 18 parts of chromium nitrate, containing 9 mols of water, are dissolved in hot water to form a saturated solution.

(4) 18 parts thorium nitrate, containing 12 mols of water, are dissolved in 100 parts of water.

(5) Solutions 1 and 2 are poured together and 250 parts of pulverized iron ore, of the hydrated iron oxide type, are kneaded in. Thereupon a mixture of solutions 3 and 4 are added, and the whole vigorously kneaded. The reaction mixture, which is alkaline, is sucked, pressed and dried at a temperature of 150° C. The cake formed is then broken up, and constitutes a base exchange body containing alkali, aluminum, zinc, chromium and thorium, with iron oxide embedded in it, the latter being the main catalytic component of the contact mass.

The contact mass obtained is hydrated with water, again dried at temperatures 120–150° C., and filled into a converter. Pure or impure water gas, containing a slight excess of steam, is passed over the contact mass at 400-600° C., and a gas mixture is produced which contains only small amounts of carbon monoxide.

If desired the base exchange body described above, after hydration, may be treated with a 5-10% solution of calcium nitrate in order to exchange alkali for calcium oxide. The calcium nitrate solution is preferably repeatedly trickled over the base exchange body. Other elements may also be introduced by base exchange, by treating with their salt solutions, either at ordinary or somewhat higher temperatures. Examples of these elements are one or more of the following: magnesium, strontium, beryllium, zirconium, thorium, titanium, manganese, copper, nickel, iron, lead, chromium, cerium.

Another class of effective contact masses for this reaction can be obtained by treating the base exchange body, with or without introduction of other exchangeable bases as described above, with salt solutions of the metal acids of the fifth and sixth group of the periodic system, such as for example, vanadic acid, chromic acid, molybdic acid, tungstic acid, or uranic acid. The treatment can be effectively carried out by causing dilute solutions such as dilute ammonium vanadate solutions, chromic acid solutions, ammonium tungstate solutions, and the like, to react with the base exchange body. The resulting salt like bodies are excellent catalysts for the water gas process.

It is sometimes desirable to leach contact masses containing base exchange bodies described above with dilute mineral acids, the leaching being carried out until part or all of the exchangeable bases are removed. Thus, for example, the base exchange body may be leached by trickling 1 to 2% nitric acid over it. The salt like bodies described above may also be acid leached, and are effective contact masses for the reaction.

Other non-silicious base exchange bodies containing catalytically effective components or components having stabilizer or stabilizer promoted action may be prepared, and may be coated onto inert carrier fragments, such as unglazed porcelain, bauxite, diatomaceous stones, asbestos, nickel, copper or iron ores, pyrite cinder, calcined magnesia, dolomite, and the like.

The reaction temperature with these modified contact masses is from 400 to 600°, but in the case of many of the contact masses the most effective temperatures lie between 400 and 500° C. The reaction may be carried out with or without pressure, and when pure carbon monoxide and steam are used the resulting gases, after removal of carbon dioxide and traces of carbon monoxide, may be directly used for the ammonia synthesis.

When it is desired to effect the water gas process with hydrocarbons instead of carbon monoxide, it is desirable to use contact masses which contain nickel. A mixture of hydrocarbon gases and steam, such as gases rich in methane, as natural gas, gases obtained from the distillation of carbonaceous materials, such as coal, cracking still tail gases, or gases from the destructive distillation of tar oils, naphthalene, phenanthrene, and the like, are mixed with steam and passed over the contact mass to produce carbon dioxide and hydrogen. It is sometimes desirable to maintain the heat by alternately using hydrocarbon and air and hydrocarbon and steam mixtures. The simultaneous use, in which sufficient oxygen is present to maintain the temperature, is also advantageous.

*Example 2*

The conversion of carbon monoxide containing gases and steam into carbon dioxide and hydrogen, as described in Example 1, can also be carried out in the presence of permutogenetic contact masses which contain $SiO_2$ in the nucleus, that is to say zeolites and their derivatives. These zeolites may be two-component zeolites, that is to say the reaction products of silicates and metallates, or silicates and metal salts, or they can be multi-component zeolites, that is to say the reaction products of silicates with at least one metallate and at least one metal salt. Some of the zeolites may be direct catalysts and others may contain the catalytic components embedded in them as diluents, as in the case of the non-silicious base exchange body described in connection with Example 1. A multi-component zeolite contact mass may be prepared as follows:

(1) 26 parts of $SiO_2$, in the form of a commercial sodium waterglass solution, are diluted with 4-5 volumes of water.

(2) 4.5 parts of freshly precipitated beryllium hydroxide are dissolved in sufficient 5 N. sodium hydroxide solution, to transform them into the sodium beryllate.

(3) 60 parts of nickel nitrate, with 6 mols of water, are dissolved in 200 parts of water.

The waterglass and beryllate solutions are poured together and the nickel nitrate solution is added in a thin stream, with vigorous agitation. A gel precipitates, which should be alkaline to phenolphthalein. This gel is separated from the mother liquor, carefully washed and dried at temperatures below 100° C. After drying, the fragments obtained are hydrated with water in order to remove the excess of adherent alkali. After hydration a 5% calcium nitrate solution, or a 5% magnesium nitrate solution is trickled over the base exchange body in order to replace part of the alkali by calcium oxide or magnesium oxide or a mixture of both. The contact mass prepared can be used for the conversion of carbon monoxide and steam into carbon dioxide and hydrogen by passing the gas and steam mixture over the contact mass at 450–500° C. The resulting product contains only very small amounts of unconverted carbon monoxide.

The beryllate in the zeolite may be replaced partly or wholly by other metallates, such as for example zincates, plumbites, vanadites, chromites, aluminates or cadmiates. The nickel nitrate solution may also be replaced partly or wholly by salts of one or more of the following elements: chromium, thorium, aluminum, manganese, titanium, copper, zinc, lead, zirconium.

Instead of preparing a three-component zeolite a two-component zeolite can be produced by causing the waterglass to react with sodium beryllate, sodium plumbite, or sodium zincate. In order to obtain good yields the excess alkali over that required to maintain alkalinity to phenolphthalein may be neutralized with nitric acid. Another class of two-component zeolites can be prepared by causing the waterglass to react with one or more metal salts, such as the salts of nickel, copper, cerium, titanium, chromium, thorium, lead, zinc, or zirconium. The amount of salt solution must be chosen so that after all of the solutions have been added the reaction mixture remains alkaline to litmus, or preferably, neutral or alkaline to phenolphthalein.

Other modifications of the contact masses can be obtained by using complex compounds of copper or nickel, such as, for example, the ammonia complexes, instead of the corresponding simple salts.

The effectiveness of the contact masses for the catalytic water gas process may be further enhanced by trickling salt solutions over them in order to exchange more or less of the alkali for other bases, or, part or all of the exchangeable alkali may be leached out by means of 2 to 3% nitric acid solutions.

Other effective modifications are obtained by forming the salt like bodies of the base exchange bodies with metal acids of the fifth and sixth group of the periodic system, as described in connection with the contact masses in Example 1.

In order to cheapen the contact mass it is sometimes desirable to use the zeolite body as an adhesive or binder for iron oxide catalysts. Thus, for example, powdered or very porous iron oxides may be impregnated with the gelatinous base exchange bodies, or may be impregnated with the component solutions which react to form the base exchange body. Excellent contact masses are thus obtained.

*Example 3*

Aldolizations and crotonizations may be effectively carried out by means of a permutogenetic contact mass prepared as follows:

(1) 19 parts of beryllium nitrate, containing 3 mols of water, are dissolved in 100 parts of hot water and sufficient 5 N. sodium hydroxide solution is added to form sodium beryllate.

(2) 30 parts of zinc nitrate, containing 6 mols of water, are dissolved in 100 parts of water, and also transformed into the corresponding zincate by means of 5 N. sodium hydroxide.

(3) 5.5 parts of thorium nitrate, containing 12 mols of water, are dissolved in 100 parts of water.

(4) 25 parts of zirconium nitrate, containing 5 mols of water, are dissolved in 200–250 parts of water.

Solutions 1 and 2 are poured together, and pulverized, unglazed porcelain is added until the suspension just remains readily stirrable. Thereupon a mixture of solutions 3 and 4 is added, care being taken that the reaction mixture remains alkaline or neutral to phenolphthalein. The body obtained, which is a diluted base exchange body, is separated from the mother liquor in the usual manner, dried at temperatures preferably below 100° C., hydrated by trickling water over it, and again dried, after which it is ready for use.

The contact mass is placed in a converter in a thick layer and vapors of acetaldehyde are passed over it at 80–200° C. and are transformed into aldol or crotonaldehyde, depending on the reaction condition. The crotonaldehyde obtained can be used as a raw material for the production of butyl alcohol by reduction with hydrogen in the presence of contact masses containing copper.

A modified contact mass can be obtained by trickling a 1 to 2% nitric acid solution over the base exchange body in order to leach out part or all of the exchangeable alkali. Other modified contact masses can be obtained by introducing cadmium or titanium by base exchange, or by forming the saltlike bodies with the metal acids of the fifth or sixth group of the periodic system.

Base exchange bodies containing $SiO_2$ in the nucleus may be obtained by substituting waterglass for part of the metallates. Such contact masses, especially when leached with acid, are very effective.

The permutogenetic bodies described in the foregoing examples may also be used as aldolization and crotonization contact masses, but they should preferably be free from iron.

Instead of or in addition to using unglazed porcelain as a diluent other diluents, such as asbestos, kieselguhr, quartz, and the like, may be used.

*Example 4*

50 parts of finely ground pumice meal are suspended in 250 parts of water, and a mixture of strong thorium nitrate and titanium nitrate solutions, containing 25 parts of thorium nitrate and 10 parts of titanium nitrate, are added. Ammonia water is then added, with vigorous agitation, or, if desired, a dilute alkali solution may be added until the oxides of titanium and thorium are precipitated in the carrier. The mass obtained is filtered and carefully washed with distilled water until free from soluble salts. 25 parts of $SiO_2$, in the form of a commercial sodium waterglass solution, are diluted with 250 parts of water, and the press cake containing kieselguhr impregnated with thorium and titanium oxides is vigorously stirred in. Thereupon 8 parts of aluminum oxide, in the form of the hydroxide freshly precipitated from a corresponding aluminum salt solution by means of ammonia, are treated with a 2 N. sodium hydroxide solution until the aluminum hydroxide dissolves as sodium aluminate. The waterglass-kieselguhr suspension is then poured into the sodium aluminate solution and heated to 50–60° C. with vigorous agitation. An aluminum zeolite is obtained, diluted with kieselguhr containing thorium oxide and titanium oxide. The yield may be increased by neutralizing the unnecessary excess of alkali with dilute nitric acid. The product is then sucked off from the mother liquor, washed in portions with 500 parts of water, and dried at temperatures preferably below 100° C. After drying the zeolite is hydrated with water in the usual way and again dried, followed by leaching with 1–2% nitric acid solution which is permitted to trickle over the zeolite in order to remove a maximum of exchangeable alkali.

The contact mass composition thus obtained is placed in a converter, and a mixture of organic acids and alcohols, preferably containing an excess of alcohol, is passed over the contact mass at 280–350° C., resulting in good yields of the corresponding esters. Examples of esterifications are the production of the esters of benzoic, acetic, propionic or succinic acid, with ethyl, butyl, isobutyl or benzyl alcohols. It is sometimes advantageous to pass a certain proportion of vapors of benzol and toluol over with alcohol and acid vapors, and after condensing the product the benzol or toluol may be removed by fractional distillation, which will also result in a more or less complete dehydration of the ester by reason of the formation of an azeotropic mixture of water and benzol, or in many cases of water, benzol and alcohol.

Similar contact masses may be obtained by using artificial base exchange bodies, both silicious and non-silicious, produced by wet or fusion methods, and which are readily available in the trade, and replacing a maximum of exchangeable alkali by thorium, titanium, zirconium, or a mixture. This can be effected by trickling the corresponding salt solutions over the base exchange bodies. Other modified esterification contact masses are obtained by forming the so called saltlike bodies with the metal acids of the fifth or sixth group of the periodic system, such as for example the salt like bodies, which can be obtained by treating the base exchange bodies with 1% ammonium vanadate or tungstate solutions.

A useful esterification contact mass can also be obtained by causing sodium aluminate to react with thorium nitrate in proportions so that the mixture remains alkaline to phenolphthalein. The non-silicious base exchange body obtained, particularly when leached with dilute nitric acid to remove a maximum of exchangeable alkali, constitutes a very effective esterification contact mass.

In the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When so used in the claims, the term "permutogenetic" will have no other meaning.

This application is in part a continuation of my copending applications Serial Nos. 142,783, filed October 19, 1926, which matured into Patent No. 1,728,732 dated September 17, 1929, and 171,727, filed February 28, 1927, which matured into Patent No. 1,694,620 dated December 11, 1928.

What is claimed as new is

1. A method of effecting esterification reactions which comprises causing the reaction to take place in contact with a contact mass including a catalyst and containing a permutogenetic body.

2. A method of effecting an organic reaction selected from the group consisting of polymerizations and condensations, which comprises causing the reaction to take place in contact with a contact mass including a catalyst and containing a permutogenetic body.

3. A method of effecting esterification reactions which comprises causing the reaction to take place in the vapor phase at elevated temperatures in contact with a contact mass including a catalyst and containing a diluted permutogenetic body.

4. A method of effecting esterification reactions, which comprises causing the reaction to take place in contact with a contact mass including a catalyst and containing a permutogenetic body, at least one of the catalytically effective components being chemically combined in or with the permutogenetic body.

5. A method of effecting esterification reactions, which comprises causing the reaction to take place in contact with a contact mass including a catalyst and containing a permutogenetic body, at least one of the catalytically effective components being chemically combined in or with permutogenetic body in non-exchangeable form.

6. A method of effecting an organic reaction selected from the group consisting of polymerizations and condensations, which comprises causing the reaction to take place in contact with a contact mass including a catalyst and containing a permutogenetic body, the contact mass also containing at least one stabilizer.

7. A method of effecting esterification reactions, which comprises causing the reaction to take place in contact with a contact mass including a catalyst and containing a permutogenetic body, the contact mass containing at least one stabilizer promoter.

8. A method of effecting an organic reaction selected from the group consisting of polymerizations and condensations, which comprises causing the reaction to take place in the vapor phase at elevated temperatures in contact with a contact mass including a catalyst and containing a permutogenetic body, the contact mass containing at least one stabilizer promoter.

9. A method of producing carbon dioxide and hydrogen, which comprises causing gas containing carbon monoxide to react with steam, at elevated temperatures, in the presence of a contact mass including a catalyst favoring molecular associations and containing at least one permutogenetic body.

10. A method of producing carbon dioxide and hydrogen, which comprises causing carbon compounds, at least a part of the carbon of which is capable of further combination with oxygen, to react in the vapor phase with steam in the presence of a contact mass including a catalyst favoring molecular associations and containing at least one permutogenetic body.

Signed at Pittsburgh, Pennsylvania, this 7th day of March, 1928.

ALPHONS O. JAEGER.